No. 634,811. Patented Oct. 10, 1899.
P. EIBIG.
ELECTRIC METER.
(Application filed Feb. 10, 1899.)

(No Model.) 2 Sheets—Sheet 1.

Witnesses
John Lorna
Juline Lutz

Inventor
Paul Eibig
per
Attorneys

No. 634,811. Patented Oct. 10, 1899.
P. EIBIG.
ELECTRIC METER.
(Application filed Feb. 10, 1899.)
(No Model.) 2 Sheets—Sheet 2.
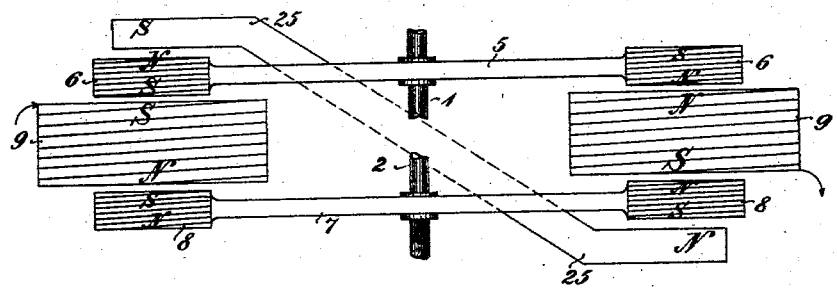
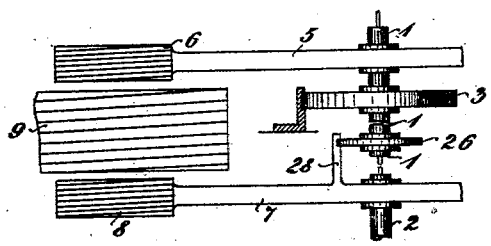
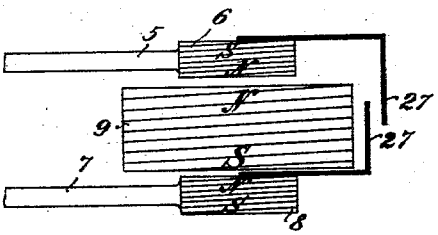
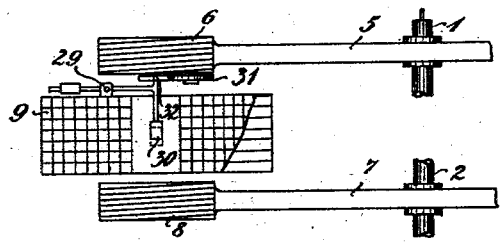
Witnesses
Inventor
Paul Eibig

UNITED STATES PATENT OFFICE.

PAUL EIBIG, OF BERLIN, GERMANY, ASSIGNOR TO EMANUEL BERGMANN, OF SAME PLACE.

ELECTRIC METER.

SPECIFICATION forming part of Letters Patent No. 634,811, dated October 10, 1899.

Application filed February 10, 1899. Serial No. 705,174. (No model.)

*To all whom it may concern:*

Be it known that I, PAUL EIBIG, a subject of the German Emperor, residing at Annenste 16, Berlin, in the Empire of Germany, have invented certain new and useful Improvements in Electric Meters; and I do hereby declare the following to be a full, clear, and exact description of the invention, such as will enable others skilled in the art to which it appertains to make and use the same.

This invention relates to an improved electric registering apparatus or meter consisting of a double-working mechanism with balance-lever adjustment in which the stationary current-feed coils act upon two pairs of tension-coils mounted on balance or double-armed levers and constantly oscillating under the influence of two clockworks, as in the case of horizontal pendulums, with a small amplitude, the action of the said current-feed coils being such as to either attract or repel the two pairs of tension-coils. The difference thus obtained in the working of the two clockworks serves as a means for measuring the amount of electricity used.

The object of the invention is to concentrate the oscillations of the solenoids upon the magnetic field of the current-feed coils, and thereby to obtain a constant sensitiveness as well as an exact proportionality of the indications.

The invention is shown in the accompanying drawings, in which—

Figure 1:
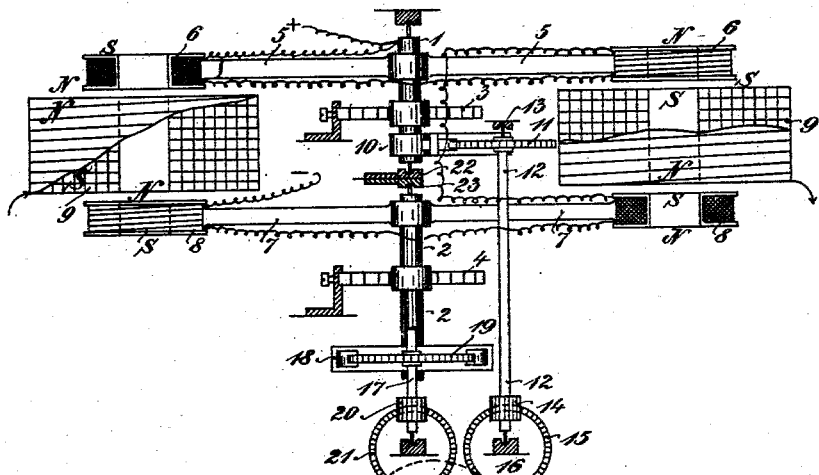
Figure 2:
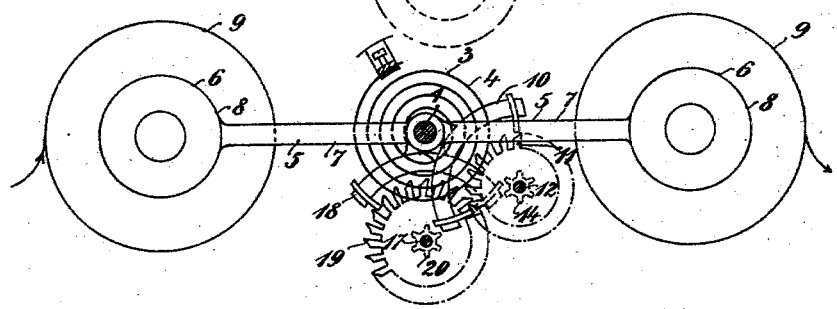
Figure 3:
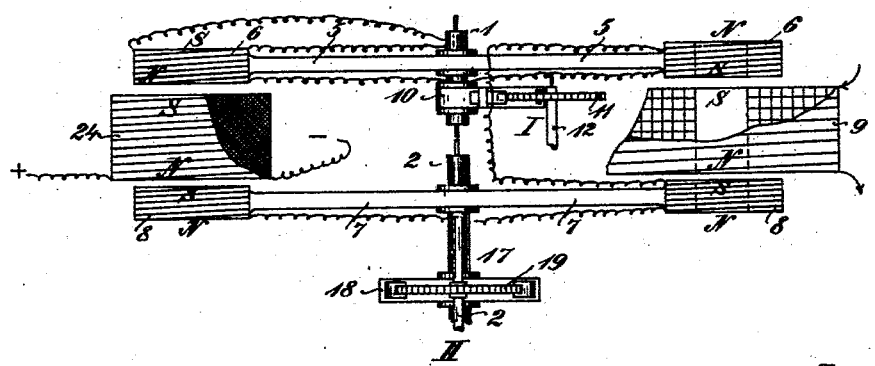

Figures 1 and 2 represent a constructional form of the registering device or meter with spring adjustment or regulation in front elevation and plan, respectively; Fig. 3, a similar view to Fig. 1, but in which the spiral springs are substituted by the electrodynamic directing power obtained from a stationary coil; Fig. 4, a front view of a modification in which the springs are substituted by the power derived from a permanent magnet. Fig. 5 shows the elastic coupling of both balance beams or levers; Fig. 6, a magnetic coupling of both balance beams or levers for the purpose of preventing differences in the working when no current passes through the registering device, and Fig. 7 shows the method of influencing the meter by the arrangement of a relay for the same purpose.

As is seen from Fig. 1, the vertical arbors 1 and 2 of the two clockworks I and II are arranged above one another in axial alinement. The arbor 1 is supported on the step-bearing 22, while the upper end of the arbor 2 is located in the bearing 23. Upon the arbor 1 a horizontal double-armed lever 5, of comparatively light weight, is fixed, at the ends of which a pair of solenoids 6 are arranged which are energized by the working current. As directing or guiding power I provide the spiral spring 3, which has its inner end connected upon the arbor 1, while its outer end is fastened outside, and which may also be used for conveying the current to the solenoid-coils, for which latter purpose, however, according to Fig. 1, separate conducting-wires are indicated. The oscillations of this double-armed lever 5 are communicated by the anchor 10, mounted on the arbor 1, to the escapement-wheel 11, which is mounted on the shaft 12, running in bearings 13 and 16. The movement of the anchor is further transmitted to the driving-gear of the clockwork I by means of the pinion 14, mounted on the shaft 12, which said pinion gears with the crown-wheel 15.

The arrangement of the second clockwork II is entirely analogous to that of the clockwork I. Upon the arbor 2 the double-armed lever 7, with the solenoids 8, further the spiral spring 4, and the anchor 18 are mounted, the latter engaging with the escapement-wheel 19. The said escapement-wheel is mounted on the shaft 17, the rotary movement of which is transmitted to the clockwork II by means of the pinion 20 and of the crown-wheel 21.

The two double-armed levers 5 and 7, with their two pairs of solenoids 6 and 8, respectively oscillate with a relatively small amplitude—as is, for instance, usual in the "Graham" work—above or below the stationary current-feed coils 9. As is to be seen from the denominations of the poles, the directing power of the springs is increased by the attracting power of the current-feed coils 9 upon the solenoids 8, but is weakened by the repelling effect upon the solenoids 6. Consequently, according to the strength of the current traversing the coils 9 the balance beam or lever 7 of the clockwork II oscillates more rapidly, whereas the balance beams or levers of the clockwork I oscillate more slowly. The difference between both rates of speed is transmitted by suitable means, such as a differential gearing, to a registering mechanism, as indicated at D in the drawings, and represents the measure of the amount of energy used.

In order to reduce as much as possible any incorrectness resulting from alterations to which the spiral springs 3 and 4 are subject, a single double-wound spiral spring may be employed for both clockworks.

Instead of utilizing the directing power of the elastic springs 3 and 4 it is also possible to use the electrodynamic force of a solenoid or electromagnet 24, Fig. 3, for actuating both balance beams or levers. As, according to the denomination of poles in Fig. 3, one and the same electromagnet 24 acts simultaneously upon both clockworks, any change in the strength of the electromagnet will not affect the difference between the speeds of both clockworks, which said difference alone is used for the measuring. The other (right) arm of the lever 5 or 7, respectively, may, analogously to Figs. 1 and 2, be influenced by a stationary current-feed coil 9, arranged between the solenoid-coils 6 and 8.

According to Fig. 4 the electromagnet 24 of Fig. 3 is substituted by a permanent magnet 25, the poles of which only influence the outer poles of the two coils 6 and 8 in order to enable the two current-feed coils 9—required, for instance, in the three-wire system—to independently act, either retarding or accelerating upon the inner poles of the pairs of solenoids 6 and 8, as in Figs. 1 and 2.

In the arrangement represented the magnetic effects are indicated by the denominations of poles. Instead of the electromagnet 24, Fig. 3, and of the magnet 25, Fig. 4, of a somewhat straightened shape other equivalent arrangements may of course be likewise employed.

If the pairs of solenoid-coils 6 are sufficiently close together and strong relatively to the pair 8, an electrodynamic influence exerted by the pair of coils of the one work upon that of the other work is possible even in the entire absence of current or in the presence of a current of however small strength it may be, and this electrodynamic influence is applicable for compensating small working differences between the two works, or, in other words, for obtaining the "coincidence" of or synchronism of working in the absence of a current, so as to avoid incorrect registering. This coincidence or sychronism of working of the two works may be still further enhanced by elastically coupling both balance beams or levers by means of a sufficiently weak coupling-spring 26, such as represented in Fig. 5. This spring 26 has its inner end fastened to the arbor 1 of the clockwork I, while its outer end is fixed to a tappet 28, mounted on arbor 2 of the clockwork II. Instead of using such coupling-spring it is possible to obtain a sufficiently strong directing influence or resistance for both balance-levers by arranging an iron arm 27 on the solenoids 6 and 8, respectively, (see Fig. 6,) the arrangement being such that the arm polarized by the coil 6 reaches closely up to the corresponding arm of the solenoid 8, oscillating below and appertaining to the other work to be kept going in coincidence or synchronism.

In order not to be compelled to have the elastic or magnetic coupling of the two balance-levers 5 and 7 chosen too strong and to thereby disturb the results as regards the charging or "load" of the registering mechanism, the electric force of the current-feed coils may be used indirectly—for instance, by the aid of an auxiliary device—in order that if a certain initial strength of current be reached the coupling of both works, then no longer necessary, may be suppressed. To attain the same purpose, the arangement may also be such (see Fig. 7) that instead of both balance-levers being coupled one of the two works—for instance, the upper one—is when working without current "incorrectly" influenced by the elastic or magnetic action of an auxiliary device. This device consists of an iron core 30, aranged in one current-feed coil 9 and adapted to rotate about the pivot 29. This iron core is already drawn into the coil 9 at the initial strength of current; but if no current is present its spring-actuated point 32 presses against the free extremity of the spiral spring 31, mounted on the balance-lever 5, and thereby slightly accelerates the oscillations of said balance-lever 5. By this arrangement I prevent clockwork II from going faster than clockwork I when no current passes through the apparatus, since the speed of clockwork I is by the action of spring 31 increased beyond that of clockwork II. The registering device obviously may be constructed to register only when the speed of clockwork II exceeds that of clockwork I, so that with the arrangement above described there is no danger of any registration being made while no current passes through the apparatus.

The shapes of coils and their arrangements represented in the drawings may of course also be substituted by other forms, for instance in such a manner that the current-feed coils are not surrounded above and below by the tension-coils, but so that the latter are adapted to oscillate to the right and left or even only upon one side opposite the stationary coils.

Owing to the use of a clockwork operating with a small amplitude—as, for instance, in the case of the Graham or similar escapement—for obtaining small oscillations of the balance-lever, the solenoids are always kept within the magnetic field of the current-feed coils, so that the sensitiveness or, in other words, the "constant" of the registering mechanism is always retained unchanged.

It is especially the double-sided arrangement of the coils which constitutes an advantage for such registering mechanism working with two clockworks.

By altering the axial position of the stationary current-feed coils relatively to the tension-coils, oscillating above and below, or, in other words, by slightly displacing the former in upward or downward direction, the proportionality of the indications of the registering mechanism can be regulated in a peculiar manner, so that in both clockworks simultaneously the relative influences are altered, the sum of which represents the measure of the amount of electricity used.

Having now particularly described and ascertained the nature of the said invention and in what manner the same is to be performed, I declare that what I claim is—

1. An electricity-meter including a stationary coil or coils, oscillating levers carrying coils arranged to swing in the magnetic field of said stationary coil or coils, a directing or resistance mechanism tending to return said levers to a predetermined position, and a separate clockwork connected with each of said levers.

2. An electricity-meter including a stationary coil or coils, oscillating levers carrying coils arranged to swing in the magnetic field of said stationary coil or coils, a directing or resistance mechanism tending to return said levers to a predetermined position, an anchor mounted to swing with each of said levers, and separate clockworks each having an escapement-wheel controlled by one of the said anchors.

3. An electricity-meter including a stationary coil or coils, oscillating levers carrying coils arranged to swing in the magnetic field of said stationary coil or coils, a directing or resistance mechanism tending to return said levers to a predetermined position, said mechanism consisting of a torsion-spring connecting the two levers, and a separate clockwork connected with each of the levers.

4. An electricity-meter including a stationary coil or coils, oscillating levers carrying coils arranged to swing in the magnetic field of said coil or coils, transversely of the axis of said coil or coils, a directing or resistance mechanism tending to return said levers to a predetermined position, and a separate clockwork connected with each of said levers.

In testimony whereof I affix my signature in presence of two witnesses.

PAUL EIBIG.

Witnesses:
ERWIN L. GOLDSCHMIDT,
CHAS. H. DAY.